Figure 1:
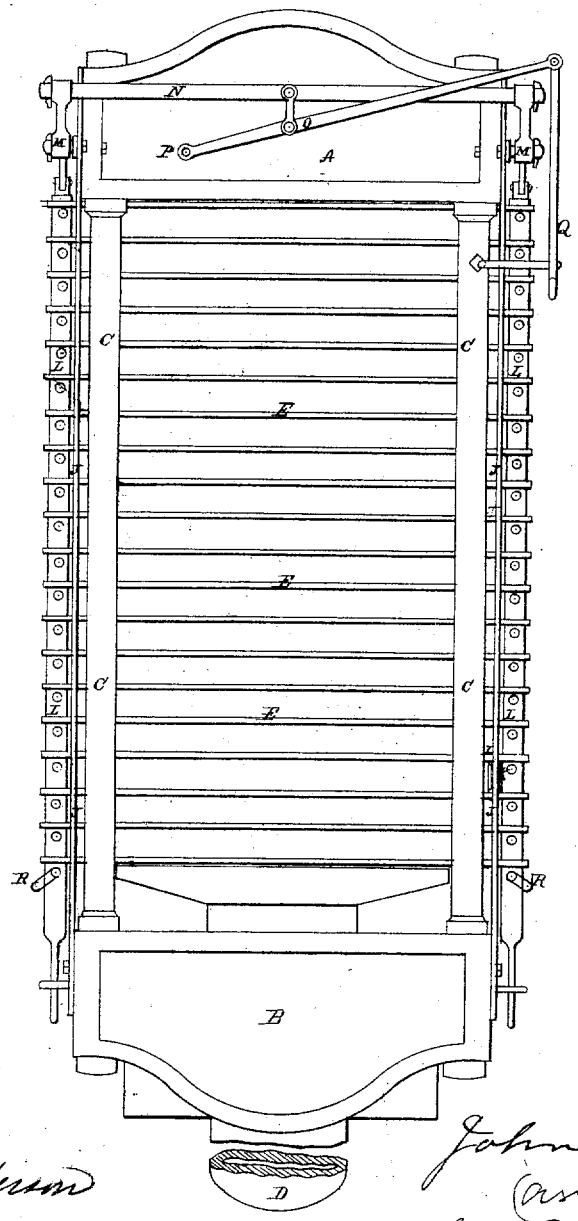

3 Sheets--Sheet 1.

R. R. WILSON.

Hot Pressing Textile Fabrics.

No. 4,867. Reissued April 9, 1872.

WITNESSES.

W. G. Henderson

W. Bradford

John J. Crawford
(Assignee)
by Crosby & Gould.
Attys.

AM. PHOTO-LITHOGRAPHIC CO. N.Y. (OSBORNE'S PROCESS.)

R. R. WILSON.

Hot Pressing Textile Fabrics.

No. 4,867. Reissued April 9, 1872.

Witnesses
W. Bradford
W. H. Henderson

John J. Crawford,
(Assignee)
by his Atty's
Crosby & Gould

AM. PHOTO-LITHOGRAPHIC CO. N.Y. (OSBORNE'S PROCESS.)

3 Sheets--Sheet 3.

R. R. WILSON.

Hot Pressing Textile Fabrics.

No. 4,867. Reissued April 9, 1872.

Witnesses
W. Bradford
W. G. Henderson

J. G. Crawford
Assignee
by his Attys
Crosby & Gould

AM. PHOTO-LITHOGRAPHIC CO. N.Y. (OSBORNE'S PROCESS.)

UNITED STATES PATENT OFFICE.

RICHARD RENNER WILSON, OF HALIFAX, ENGLAND, ASSIGNOR, BY MESNE ASSIGNMENTS, TO JOHN J. CRAWFORD.

IMPROVEMENT IN MACHINES FOR HOT-PRESSING TEXTILE FABRICS.

Specification forming part of Letters Patent No. 41,801, dated March 1, 1864; reissue No. 4,867, dated April 9, 1872.

*To all whom it may concern:*

Be it known that RICHARD RENNER WILSON, of Halifax, in the county of York and Kingdom of England, has invented new and useful Improvements in Apparatus for Hot-Pressing Textile Fabrics; and I do hereby declare that the following, taken in connection with the drawing which accompanies and forms part of this specification, is a description of the said invention sufficient to enable those skilled in the art to practice it.

The invention appertains to that class of apparatus for hot-pressing textile fabrics in which are employed a vertical series of hollow or chambered plates, supported and operated between the pillars of a press, and heated or cooled by the passage through them of suitable fluids, ordinarily steam or water, at the proper temperature. The invention, moreover, relates to the mechanical means employed for supporting such plates within the press, for increasing the distance between adjacent plates in the series, in order to facilitate the introduction or removal of the fabrics, and for supplying and withdrawing the steam or water to and from the interior of the plates. The plate-supporting mechanism, which embodies part of this invention, consists of a system of horizontal cross-bars or rods, arranged vertically at each end of the press, and sustained at definite distances from each other, by suitable inter-connecting links, so constructed and applied as to permit the cross-bars to slide from the bottom upward between upright guide-rails which embrace their ends. Upon the corresponding cross-bars of the two opposite systems rest handles which project from the opposite ends of each plate, so that while the successive plates are supported at definite distances from each other any one of them may be raised upward through almost the entire distance by which it is separated from the plate next above it, without disturbing the position of the systems of cross-bars or of any other plate or plates in the series. The plate-lifting mechanism, which constitutes another part of this invention, consists of two vertical hoisting-frames situated on opposite sides of the press, just beyond the ends of the plates, and so inter-connected by a system of compound levers as to be capable of having imparted to both of them a substantially equal and simultaneous vertical movement. These hoisting-frames play in suitable guides, and are provided with mechanical devices for attaching them to any plate in the series which it may be found desirable to raise above its supports, in order to make room below it for the more convenient introduction or removal of the fabrics which have been or are to be pressed, so that the lifting of each plate in the series is accomplished by the same range of movement of the hoisting-frames. The remaining part of this invention is an improvement upon the arrangement of main chambers and conducting-pipes shown and described in the English patent No. 1,017, of 1860, and is embraced in the specific arrangement, herein shown and described, of the conducting-pipes and the main pipes or chambers, through which the steam or water is caused to flow to and from the interior of the plates to be heated or cooled. Each of these conducting-pipes consists of two sections or joints, both located outside of the main pipes or chambers, one section of each pair sliding within the other, and suitably packed. The lower section is directly connected at its base with the main pipe or chamber, and extends upward therefrom at sufficient distance to accommodate the entire ascent or descent of the upper section under the action of the press, so that the dimensions of the main pipe or chamber are not any greater than is requisite for the proper supply of steam or water, as would otherwise be the case if either section of the conducting-pipe protruded down into it, as in the patent referred to; and thus is effected an economy of steam by the withdrawal of extensive condensing and radiating surfaces, besides obviating the necessity of constructing a large and expensive chamber of peculiar and awkward shape.

The drawing represents an apparatus embodying the invention.

Figure 2:
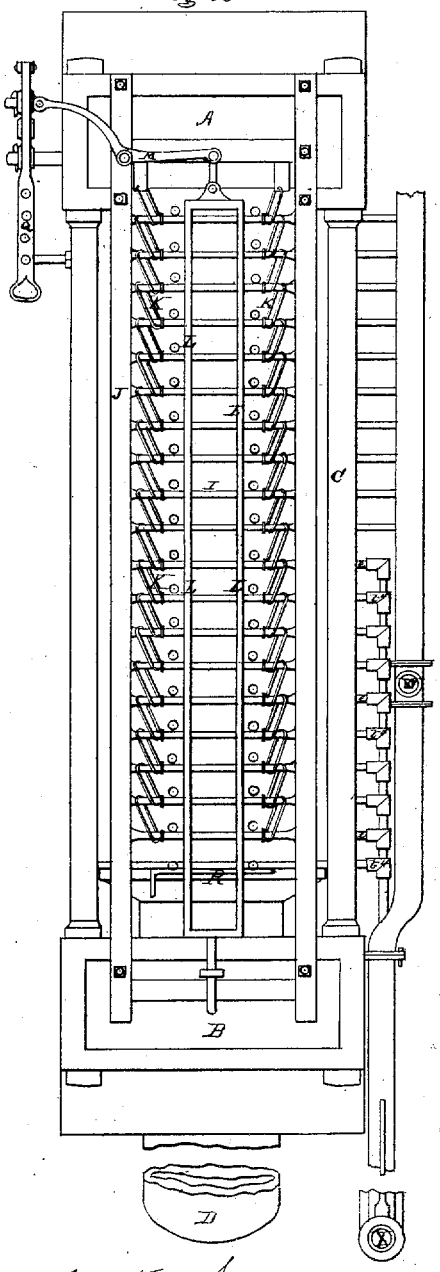
Figure 4:
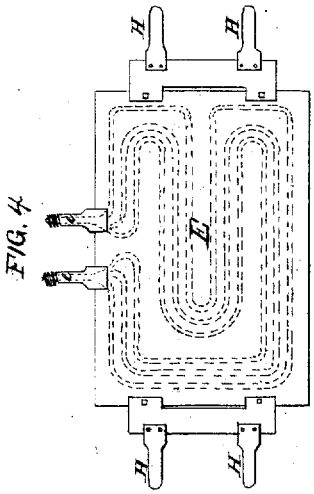
Figure 5:
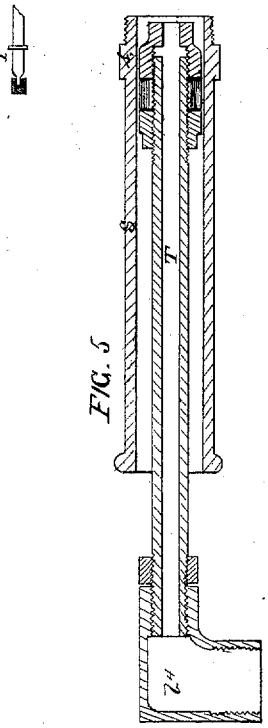
Figure 3:
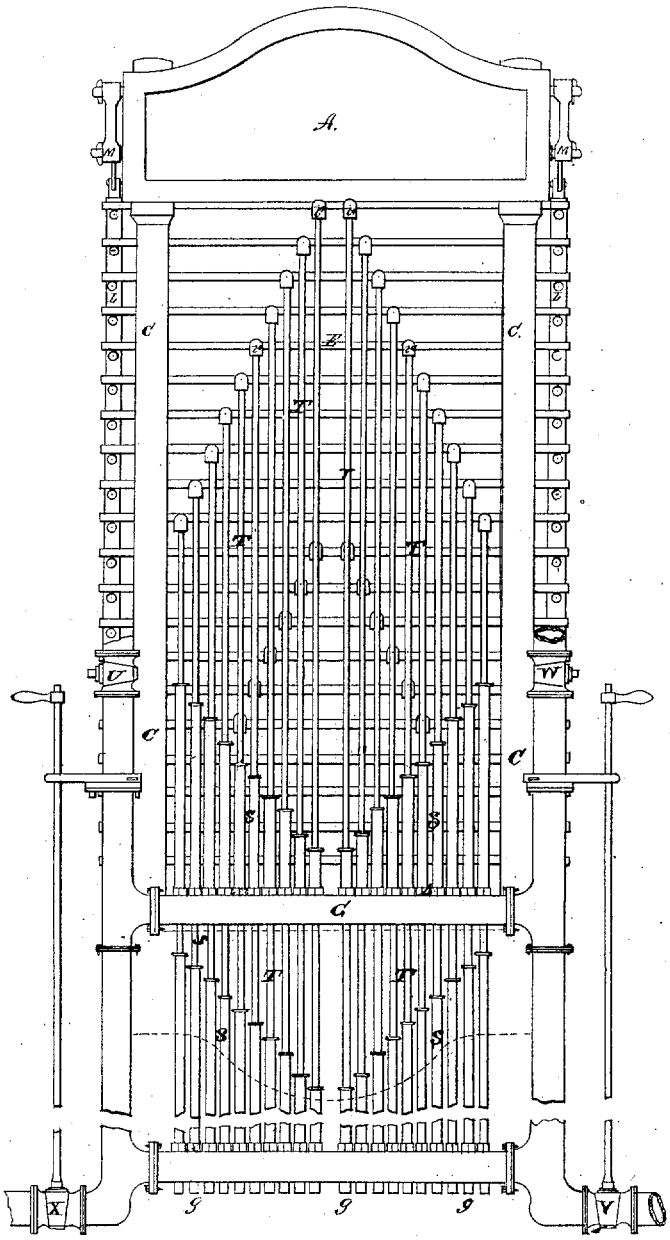

Figure 1 is a front elevation of the apparatus; Fig. 2 is an end elevation; and Fig. 3 is a back elevation of the same. Fig. 4 is a plan of one of the plates. Fig. 5 is a section of one of the connections or conducting-pipes.

A and B are top and bottom, and C are pillars connecting the same together, forming the frame-work of what is commonly known as a "press." D is the hydraulic ram or pump usually employed for applying the pressure required in the use of such apparatus. E are the plates, and T the connections or pipes through which steam is supplied to the plates from the chambers G. The plates have handles H at each end projecting outside the pillars, which rest upon cross-bars or rods I, capable of sliding in the upright guide-rails or frames J, and are connected together by links K, which suspend the plates. L are two double rods suspended on two levers, M, hinged to the frame J at the press-head, one at each end or each side of the press, and which levers are connected together by a bar, N, to which is attached a lever, O, also hinged to the press-head at P, with a handle, Q, attached thereto. By placing a pin, R, under the handles of any plate at each end through holes in the rods L, and operating the handle Q, that plate can be lifted a little to afford more space to introduce fabrics to be pressed. The arrangement of the passages in the plates is shown by dotted lines in the plan, Fig. 4. The number of lines and sizes thereof are regulated to suit the size of plate and amount of heat required to be given thereto. The connecting-pipes are shown at Fig. 5 in section, the larger pipe forming a cylinder, S, which, by means of a square part, *s*, is screwed into the supply-pipe or chamber G. The small pipe T has two bosses, $t^1$ $t^2$, screwed on at one end, with packing $t^3$ betwixt, forming a piston fitting to the interior of the cylinder, which is capable of sliding therein and of adjustment by a key passed through a hole in the opposite side of the pipe G, which hole is filled up with a screw-plug, *g*. To the other end of the pipe T is screwed an elbow, $t^4$, which is to screw onto one of the projecting pipes, *e*, of the plates E; and it will be seen, on reference to Figs. 3 and 4, that each plate has two of these connecting-pipes attached thereto, one for inlet and the other for outlet of steam or other fluid.

The manner in which this apparatus is used will be readily understood by reference to the drawing and the following explanation: The fabrics to be pressed are folded and placed betwixt the plates E; the hydraulic ram or pump is then put into action, which forces or lifts the bottom plate and fabric into close contact with the next plate and fabric, and so on, pressing the whole series of plates and fabrics compactly together. The tap U is then opened, which admits steam into the chambers G, which flows thence through all the pipes T and the plates E, heating the same and passing out at the tap V, which is also opened for that purpose. When sufficient heat has been applied the taps U and V are closed and the taps W and X are opened, when cold water flows through all the pipes and plates to cool them.

What I claim to be novel in an apparatus for hot-pressing textile fabrics, is—

1. For supporting therein a series of chambered plates, a system of horizontal cross-bars, sustained at definite distances from each other, and provided with upright guide-rails, in such manner that in the operation of the press the bottom plate can rise first, then said plate and the next in the series, and so on until all the plates rise together as one, substantially as described.

2. In combination with a series of chambered plates supported at definite distances from each other, hoisting-frames having provision for connection with and for lifting, by the same range of movement, any one or more of the plates, substantially as described.

3. In combination with the hoisting-frames, the system of levers, combined and co-operating substantially as described.

Witnesses: JOHN J. CRAWFORD.
L. W. OSGOOD,
R. L. ROBERTS.